（12）United States Patent
Rammer et al.

(10) Patent No.: US 8,831,861 B2
(45) Date of Patent: *Sep. 9, 2014

(54) METHOD AND DEVICE FOR ENGINE BRAKING

(75) Inventors: Franz Rammer, Wolfern (AT); Franz Leitenmayr, Perg (AT); Gottfried Raab, Perg (AT)

(73) Assignee: MAN Truck & Bus Oesterreich AG, Steyr (AT)

( * ) Notice: Subject to any disclaimer, the term of this patent is extended or adjusted under 35 U.S.C. 154(b) by 464 days.

This patent is subject to a terminal disclaimer.

(21) Appl. No.: 13/190,540

(22) Filed: Jul. 26, 2011

(65) Prior Publication Data
US 2012/0017868 A1     Jan. 26, 2012

(30) Foreign Application Priority Data

Jul. 26, 2010   (AT) ................................ A 1246/2010

(51) Int. Cl.
G06F 19/00 (2011.01)
(52) U.S. Cl.
USPC ........................... 701/112; 123/320; 123/336
(58) Field of Classification Search
USPC .......... 701/108, 112, 114; 123/319, 320, 336, 123/403
See application file for complete search history.

(56) References Cited

U.S. PATENT DOCUMENTS

| 4,429,533 A * | 2/1984 | Dinger | 60/606 |
| 4,449,371 A * | 5/1984 | Sone et al. | 60/611 |
| 4,563,132 A * | 1/1986 | Grimmer | 417/247 |
| 5,692,469 A | 12/1997 | Rammer et al. | |
| 6,729,303 B2 * | 5/2004 | Itoyama et al. | 123/478 |
| 7,523,736 B2 * | 4/2009 | Rammer et al. | 123/323 |
| 2012/0017869 A1 * | 1/2012 | Rammer et al. | 123/323 |

FOREIGN PATENT DOCUMENTS

EP     0736672 A2    10/1996

* cited by examiner

*Primary Examiner* — John Kwon
(74) *Attorney, Agent, or Firm* — Laurence A. Greenberg; Werner H. Stemer; Ralph E. Locher (57) ABSTRACT

A method for engine braking of a multi-cylinder internal combustion engine of a vehicle, which is preferably an engine operating on the diesel principle. The engine has at least one exhaust-gas turbocharger with an exhaust-gas turbine and a charge air compressor, and an exhaust manifold which supplies the exhaust-gas flow from outlet valves of the engine to the exhaust-gas turbocharger. A throttle device is connected between the outlet valves and the turbocharger for throttling the exhaust-gas flow and causing a pressure increase in the exhaust gas for engine braking upstream. An exhaust-gas counter-pressure and a charge air pressure are measured and, based on the measurement, a position of the throttle device can be determined to obtain a predetermined braking action. Then the exhaust-gas counter-pressure and the charge air pressure are closed-loop controlled by adjusting the throttle device corresponding to the previously determined position of the throttle device. A device for engine braking, preferably a diesel engine, has a system for carrying out the novel method.

22 Claims, 9 Drawing Sheets

METHOD AND DEVICE FOR ENGINE BRAKING

CROSS-REFERENCE TO RELATED APPLICATION

This application claims the priority, under 35 U.S.C. §119, of Austrian patent application A 1246/2010, filed Jul. 26, 2010; the prior application is herewith incorporated by reference in its entirety.

BACKGROUND OF THE INVENTION

Field of the Invention

The present invention relates to a method and a device for engine braking of an engine operating preferably on the diesel principle. The engine has at least one single- or multi-cylinder exhaust-gas turbocharger having an exhaust-gas turbine acted on by an exhaust-gas flow and having a charge air compressor. The exhaust-gas turbine and the charge air compressor are arranged on a common shaft or are connected by the latter. At least one exhaust manifold conducts the exhaust-gas flow from outlet valves of the engine to the exhaust-gas turbocharger. A throttle device is arranged between the outlet valves and the exhaust-gas turbocharger, which throttle device is actuated for engine braking such that the exhaust-gas flow is throttled and a pressure increase in the exhaust gas is thus generated upstream of the throttle device. Here, the term "upstream" is to be understood to mean a flow direction of the exhaust gas opposite to the flow direction of the exhaust gas when the latter leaves the engine via the outlet valves thereof and flows in the direction of the throttle device or exhaust-gas turbocharger.

An engine braking device and an engine braking method of interest in this context is described, for example, in commonly assigned U.S. Pat. No. 5,692,469 and its counterpart European patent EP 0736672 B1. There, engine braking is carried out by virtue of the exhaust-gas flow being throttled and a pressure increase in the exhaust gas thus being generated upstream of the throttle device, which exhaust gas flows back into the combustion chamber after an intermediate opening of the outlet valve and serves to provide the engine braking action during the subsequent compression stroke with the outlet valve still held partially open. During engine braking, an intermediate opening of the outlet valve effected by the pressure increase generated in the exhaust gas when in the throttling position is subjected to a control-based intervention by virtue of the outlet valve, which tends toward closing after the intermediate opening, being forcibly prevented from closing, and then being held partially open at the latest until the cam-controlled outlet valve opening, by the interception of a control unit installed remote from the camshaft in the outlet valve actuating mechanism.

In that engine braking method, during the engine braking mode, the throttle flaps arranged in the exhaust-gas tract are situated in a throttling position in which the associated exhaust-gas tract is not fully closed, such that a part of the built-up exhaust gas can pass the throttle flap through a narrow gap which remains open at the edge. The exhaust-gas slippage is necessary to prevent a stall of the exhaust-gas flow and an overheating of the internal combustion engine or engine.

Even though that prior engine braking method provides excellent braking action, there is in some applications a desire for an increase in the braking action during the engine braking mode in order that the other braking systems in the vehicle, such as a retarder and service brake, can be relieved of load to a greater extent or they can be dimensioned to be smaller.

SUMMARY OF THE INVENTION

It is accordingly an object of the invention to provide a method and a device which overcome the above-mentioned disadvantages of the heretofore-known devices and methods of this general type and which provides for a method and a device for engine braking which, with relatively low component and cost outlay and improved control process, provide an increased engine braking action.

With the foregoing and other objects in view there is provided, in accordance with the invention, a method for engine braking of a multi-cylinder internal combustion engine of a vehicle, the engine, which is preferably a diesel engine, has at least one exhaust-gas turbocharger with an exhaust-gas turbine and a charge air compressor, and an exhaust manifold conducting exhaust-gas flow from outlet valves of the engine to the at least one exhaust-gas turbocharger, and wherein a throttle device is disposed between the outlet valves of the engine and the exhaust-gas turbocharger and is configured to throttle the exhaust-gas flow and to generate a pressure increase in the exhaust gas for engine braking upstream of the throttle device, the method which comprises:

measuring an exhaust-gas counter-pressure and a charge air pressure;

determining, based on the measurement of the exhaust-gas counter-pressure and of the charge air pressure, a position of the throttle device to obtain a predetermined braking action; and controlling the exhaust-gas counter-pressure and the charge air pressure by adjusting the throttle device corresponding to the previously determined position of the throttle device.

The terms regulate and regulation as used herein are synonymous with closed-loop control and parameter-driven control.

According to the present invention, a method is provided for engine braking of a multi-cylinder internal combustion engine or of a multi-cylinder engine of a vehicle, which preferably operates on the diesel principle and has at least one single-stage or multi-stage exhaust-gas turbocharger having an exhaust-gas turbine and having a charge air compressor. If a multiplicity of exhaust-gas turbochargers are provided, it is preferable for at least one high-pressure stage and at least one low-pressure stage to be provided.

The internal combustion engine or the engine also has at least one exhaust manifold which supplies the exhaust-gas flow from outlet valves of the engine to the exhaust-gas turbocharger, and a throttle device which is provided between the outlet valves and the exhaust-gas turbocharger and which throttles the exhaust-gas flow, and a pressure increase in the exhaust gas is thus generated for engine braking upstream of the throttle device.

According to the method, a measurement of an exhaust-gas counter-pressure and of a charge air pressure also take place. On the basis of the measurement of the exhaust-gas counter-pressure and of the charge air pressure, a position of the throttle device to obtain a predetermined braking action can be determined. Regulation of the exhaust-gas counter-pressure and of the charge air pressure is subsequently carried out by adjusting the throttle device corresponding to the previously determined position of the throttle device.

This, in contrast with closed-loop control only on the basis of the exhaust-gas counter-pressure as a control variable, makes it possible to attain a higher exhaust-gas counter-pressure over the entire rotational speed range of the engine. The charge air pressure generated by the exhaust-gas turbocharger has a significant influence on the exhaust-gas counter-pressure. The incorporation of the charge air pressure into the regulation of the exhaust-gas counter-pressure therefore permits a faster increase of the exhaust-gas counter-pressure and therefore an improved engine braking action.

To obtain a maximum braking action at a respective engine rotational speed, according to a further aspect of the invention, firstly a maximum charge air pressure is set and, after the maximum charge air pressure for the engine rotational speed is reached, regulation of the maximum exhaust-gas counter-pressure is carried out. Depending on the engine rotational speed, therefore, a larger duct cross section of the throttle device can be opened up than is possible in conventional regulating methods.

At least one position of the throttle device corresponds to a certain exhaust-gas counter-pressure. A detection or regulation of a correct position of the throttle device is preferably carried out by a regulating unit from a comparison of the present charge air pressure with a setpoint charge air pressure at the present exhaust-gas counter-pressure. The regulating unit or closed-loop control unit may, for example, be an engine or vehicle control unit.

Figure 2:
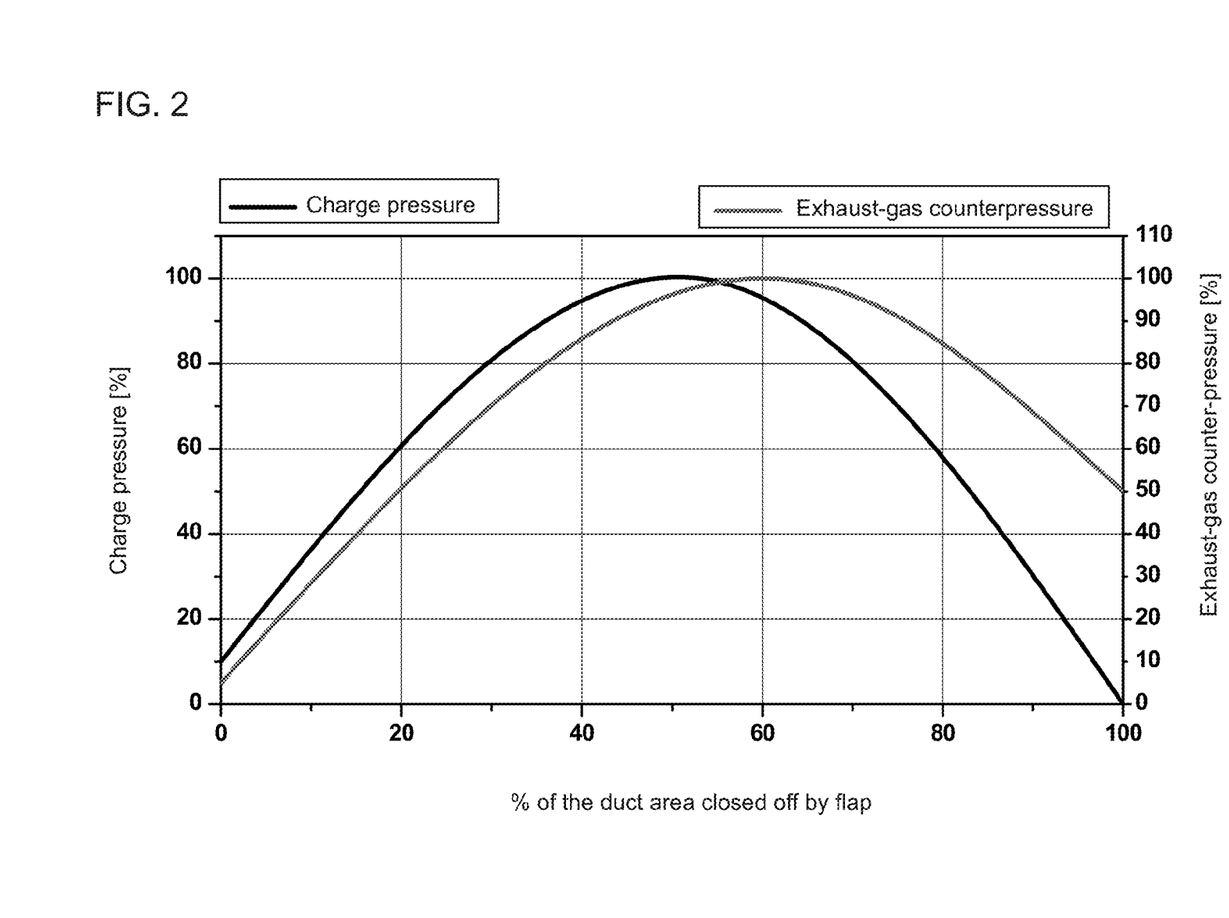
FIG. 2 shows a diagram of a profile of charge air pressure and exhaust-gas counter-pressure in relation to the position of the throttle device.

With reference to FIG. 2, an improved response behavior in the engine braking mode is therefore obtained. For example, if 90% of the duct area of the throttle device is closed off, the exhaust-gas counter-pressure amounts to approximately 65% of the maximum attainable value. If the engine braking action is now to be reduced to zero, the throttle device the exhaust-gas flow must be opened. However, if the throttle device is opened further, there is initially an increase in the exhaust-gas counter-pressure on account of the higher charge air pressure caused by the increased gas throughput. The exhaust-gas counter-pressure therefore initially increases before a decrease can take place, which would result in a poor response behavior of the engine brake. An exhaust-gas counter-pressure of approximately 65% is however likewise present if the duct area of the throttle device is closed by only 30%. In the method according to the invention, therefore, the detection of the correct position of the throttle device is carried out, as a result of which an improved response behavior is attained in the engine braking mode and the engine is thermally relieved of load as a result of the higher mass throughput.

According to a further aspect of the invention, a relationship between charge air pressure, exhaust-gas counter-pressure and braking action for respective engine rotational speeds is stored in an engine or vehicle control unit by means of characteristic maps.

If the current or present exhaust-gas counter-pressure is lower than a desired exhaust-gas counter-pressure and if the charge air pressure corresponds to a predetermined value, the position of the throttle device may be closed further. With reference to FIG. 2, the predetermined value may, for example, be defined as being attained if the charge air pressure percentage is higher than or equal to the exhaust-gas counter-pressure percentage.

If the current exhaust-gas counter-pressure is lower than a desired exhaust-gas counter-pressure and if the charge air pressure is lower than a predetermined value, the position of the throttle device can be opened further.

During the control process, it is checked, for the purpose of monitoring, whether the opening of the duct area actually yields an increase in charge pressure/exhaust-gas counter-pressure. If further opening leads to a drop in charge pressure, the throttle device is closed slightly again.

According to a further aspect of the present invention, the regulation of the exhaust-gas counter-pressure and of the charge air pressure is carried out, in addition to the regulation by the throttle device or device for throttling the exhaust-gas flow, by a unit for charge pressure regulation in which at least one wastegate which bypasses the exhaust-gas turbine is included.

With the above and other objects in view there is also provided, in accordance with the invention, a device for engine braking of a multi-cylinder internal combustion engine of a vehicle, in particular a diesel engine, the engine having an exhaust-gas turbocharger with an exhaust-gas turbine and a charge air compressor, and an exhaust manifold connected to supply an exhaust-gas flow from outlet valves of the engine to the exhaust-gas turbocharger. The novel device comprises:

a throttle device connected between the outlet valves of the engine and the exhaust-gas turbocharger and configured to throttle the exhaust-gas flow for generating a pressure increase in the exhaust gas and engine braking upstream of the throttle device;

measurement means for measuring an exhaust-gas counter-pressure and a charge air pressure;

a control unit connected to said measurement means and to said throttle device, said control unit being configured for determining, based on the measurement of the exhaust-gas counter-pressure and of the charge air pressure, a position of said throttle device to obtain a predetermined braking action, and said control unit being configured for carrying out closed-loop control of the exhaust-gas counter-pressure and of the charge air pressure by adjusting said throttle device corresponding to the previously determined position of said throttle device.

In other words, the present invention also provides a device for engine braking of a multi-cylinder internal combustion engine or of a multi-cylinder engine of a vehicle, which preferably operates on the diesel principle and has at least one single-stage or multi-stage exhaust-gas turbocharger having an exhaust-gas turbine and having a charge air compressor, exhaust manifold which supplies the exhaust-gas flow from outlet valves of the engine to the exhaust-gas turbocharger, and having a throttle device which is provided between the outlet valves and the exhaust-gas turbocharger and which throttles the exhaust-gas flow, and a pressure increase in the exhaust gas is thus generated for engine braking upstream of the throttle device.

The device for engine braking also has means for measuring an exhaust-gas counter-pressure and a charge air pressure and a control unit is also provided which is suitable for determining, on the basis of the measurement of the exhaust-gas counter-pressure and of the charge air pressure, a position of the throttle device to obtain a predetermined braking action. The control unit is also suitable for subsequently carrying out regulation of the exhaust-gas counter-pressure and of the charge air pressure by adjusting the throttle device corresponding to the previously determined position of the throttle device.

According to a further aspect of the present invention, the regulation of the exhaust-gas counter-pressure and of the charge air pressure is carried out, in addition to the regulation by the throttle device or device for throttling the exhaust-gas flow, by a unit for charge pressure regulation.

According to a further aspect of the present invention, the unit for charge pressure regulation is formed by at least one wastegate which bypasses the exhaust-gas turbine.

With the above and other objects in view there is also provided, as an alternative or in addition, a method for engine braking of an engine, the engine having, for each cylinder with a combustion chamber, at least one outlet valve connected to an outlet system, and wherein a throttle device is disposed in the outlet system. The method comprises the following method steps:

actuating the throttle device to throttle an exhaust-gas flow and to generate a pressure increase in the exhaust gas upstream of the throttle device, wherein the exhaust gas flows back into the combustion chamber after an intermediate opening of the outlet valve and serves to provide an increased engine braking action during a subsequent compression stroke with the outlet valve still held partially open;

during engine braking, effecting a control-based intervention on an intermediate opening of the outlet valve caused by the pressure increase generated in the exhaust gas when the throttle device is in the throttling position, the intervention including forcibly preventing the outlet valve, which tends toward closing after the intermediate opening, from closing, and then holding the outlet valve partially open at the latest until the outlet valve is opened under cam control, the intervention being effected by a control unit installed remote from the camshaft in the outlet valve actuating mechanism;

wherein the engine further includes at least one exhaust-gas turbocharger with an exhaust-gas turbine and a charge air compressor, and an exhaust manifold connected to supply the exhaust-gas flow from outlet valves of the engine to the at least one exhaust-gas turbocharger, and a throttle device connected between the outlet valves and the at least one exhaust-gas turbocharger and configured to throttle the exhaust-gas flow and to thereby cause a pressure increase in the exhaust gas for engine braking upstream of the throttle device;

measuring an exhaust-gas counter-pressure and a charge air pressure;

determining a position of the throttle device to obtain a predetermined braking action based on the measurement of the exhaust-gas counter-pressure and of the charge air pressure, and effecting a closed-loop control of the exhaust-gas counter-pressure and of the charge air pressure by adjusting the throttle device corresponding to the previously determined position of the throttle device.

In other words, according to a further concept of the present invention, in addition or as an alternative to the device according to the invention and to the method according to the invention for engine braking, there is provided a further method and a further device for carrying out a method for engine braking of an engine operating preferably on the diesel principle, which engine has, per cylinder, at least one outlet valve connected to an outlet system, in which outlet system is installed a throttle device which, for engine braking, is actuated in such a way that the exhaust-gas flow is throttled and a pressure increase in the exhaust gas is thus generated upstream of the throttle device, which exhaust gas flows back into the combustion chamber after an intermediate opening of the outlet valve and serves to provide an increased engine braking action during the subsequent compression stroke with the outlet valve still held partially open, wherein during engine braking, an intermediate opening of the outlet valve effected by the pressure increase generated in the exhaust gas when the throttle device is in the throttling position is subjected to a control-based intervention by virtue of the outlet valve, which tends toward closing after the intermediate opening, being forcibly prevented from closing, and then being held partially open at the latest until the cam-controlled outlet valve opening, by the interception of a control unit installed remote from the camshaft in the outlet valve actuating mechanism, wherein the engine also has at least one single-stage or multi-stage exhaust-gas turbocharger having an exhaust-gas turbine and having a charge air compressor, and at least one exhaust manifold which supplies the exhaust-gas flow from outlet valves of the engine to the at least one exhaust-gas turbocharger, and having a throttle device which is provided between the outlet valves and the at least one exhaust-gas turbocharger and which throttles the exhaust-gas flow, and a pressure increase in the exhaust gas is thus generated for engine breaking upstream of the throttle device, and a measurement of an exhaust-gas counter-pressure and of a charge air pressure is carried out, wherein on the basis of the measurement of the exhaust-gas counter-pressure and of the charge air pressure, a position of the throttle device to obtain a predetermined braking action is determined, and regulation of the exhaust-gas counter-pressure and of the charge air pressure is carried out by adjusting the throttle device corresponding to the previously determined position of the throttle device.

According to a further aspect of the present invention, at the end of the expansion stroke, when the control of the outlet valve by the camshaft takes effect again, the holding function of the control unit which previously acted as a hydraulically blocked buffer is eliminated, and then the opening of the outlet valve up to its full stroke, the holding of said outlet valve and the closing of said outlet valve again during the exhaust stroke are controlled by the associated normal outlet valve control cam via the outlet valve actuating mechanism with the control unit which then acts therein only as a mechanical buffer.

According to another aspect of the present invention, the control unit is installed and acts in a rocker arm mounted on the cylinder head and has a control piston, which is movable with low leakage in a bore of the rocker arm axially between two end positions delimited mechanically by stops and which acts at the front on the rear end surface of the outlet valve shank and which is acted on at the rear side by a compression spring and hydraulically, and a control bush which is screwed into a threaded section of the same rocker arm bore and in whose pressure chamber, which is open in the forward direction toward the control piston, is installed the compression spring acting on the control piston and a check valve, which check valve permits only the introduction of pressure medium from a pressure medium supply duct and has a compression-spring-loaded closing member. The pressure medium supply duct is supplied with pressure medium via a feed duct within the rocker arm, wherein a relief duct leads from the pressure chamber through the control bush to the upper end of the latter, the outlet opening of which relief duct is held closed during a braking process in the interception and holding phase of the control unit, for the purpose of building up and holding the pressure medium pressure in the pressure chamber and for an associated deployment and holding of the control piston in the deployed outlet valve interception position, by a stop arranged fixed on the cylinder cover.

According to a further aspect of the present invention, during a braking process, during the exhaust-gas-counter-pressure-induced intermediate opening of the outlet valve, the control piston is pushed out into its deployed end position on account of the forces acting in the pressure chamber and following the outlet valve shank, and as a result the pressure chamber which becomes larger in volume is filled with pressure medium, and therefore the control piston is subsequently hydraulically blocked in the outlet valve interception position and in said position, by means of the end surface thereof, intercepts and correspondingly holds open the outlet valve which is moving in the closing direction.

According to a further aspect of the present invention, the return of the control piston from its outlet valve interception position into its retracted basic position at the end of the holding phase takes place in that, upon the actuation of the rocker arm by the camshaft with the normal outlet cam directly or indirectly via a push rod, as a result of the pivoting of said rocker arm away from the cylinder-cover-side stop, the outlet opening of the relief duct within the control bush at the upper end of the control bush is opened up, and therefore the pressure medium situated in the pressure chamber is relieved of pressure and is released from the volume of the control piston which can now move back and is no longer blocked by the rocker arm, said release taking place until said control piston has assumed its fully retracted basic position.

According to a further aspect of the present invention—applied to an internal combustion engine with an underlying camshaft from which the actuation of an outlet valve takes place via a push rod and a subsequent rocker arm—the control unit acts in the chamber between the push rod and force introduction member of the rocker arm in a holding sleeve arranged in or on the cylinder head, and said control unit has a control sleeve coaxially movable with low leakage in the holding sleeve and supported on the upper end of the push rod and has a control piston installed so as to be coaxially movable with low leakage in a blind bore of the control sleeve, which control piston is supported at the top on a thrust transmission part articulately connected to the force introduction member of the rocker arm and is acted on at the bottom by a compression spring which acts in the direction of said thrust transmission part, which compression spring is installed in that part of the blind bore provided below the control piston and the hydraulic pressure chamber thus delimited, which pressure chamber is supplied with pressure medium, in particular engine oil, via a feed duct within the cylinder head or block and via a feed duct within the holding sleeve and via a supply duct, which communicates with said feed duct within the holding sleeve, within the control sleeve, wherein a check valve installed in the pressure chamber prevents, by means of its spring-loaded closing member, a return flow of pressure medium from the pressure chamber into the supply duct.

According to a further aspect of the present invention, during a braking process, during the exhaust-gas-counter-pressure-induced intermediate opening of the outlet valve, the control piston is deployed on account of the forces acting in the pressure chamber, and here, the rocker arm is made to perform a follow-up movement, wherein during the deployment of the control piston, after a stroke travel coordinated with the spring-open stroke of the outlet valve, the outlet opening of a relief duct within the control piston is opened up by emerging from the blind bore in the control sleeve, and the pressure medium within the pressure chamber is relieved of pressure via said relief duct, and in that, at the start of the subsequent closing movement of the outlet valve, the control piston is moved in the direction of its non-deployed basic position again by means of the rocker arm which has performed a corresponding follow-up movement and the thrust transmission part until the outlet opening of the relief duct is closed again by the wall of the blind bore, as a result of which the pressure chamber is shut off again, the control unit is therefore hydraulically blocked, and the outlet valve remains held intercepted in the corresponding partially open position.

According to a further aspect of the present invention, the elimination of the hydraulic blocking of the control piston in the control sleeve and the return of said control piston out of its outlet valve interception position into its non-deployed basic position take place when, during actuation of the push rod by the camshaft with the normal outlet cam, and the associated stroke of the control sleeve, after a certain stroke, coordinated with the maximum opening stroke of the outlet valve, of the control sleeve, as a result of the emergence thereof from the holding bore of the holding sleeve, the outlet cross section of a relief bore extending transversely from the pressure chamber is opened up, the pressure medium situated in the pressure chamber is relieved of pressure and is released from the volume of the control piston which can now move back, said release taking place until said control piston has assumed its fully retracted basic position, attained when the thrust transmission part sets down on the end side of the control sleeve.

According to a further aspect of the present invention, the outlet valve, after the exhaust-gas-counter-pressure-induced intermediate opening, is held in an interception position, the distance of which from the closed position amounts to approximately $1/5$ to $1/20$ of the full camshaft-controlled outlet valve opening stroke.

According to a further aspect of the present invention, the control unit is also taken into consideration as a hydraulic valve play compensating element, a degree of play occurring in the valve actuating mechanism being compensated by means of corresponding pressure medium replenishment into the pressure chamber with corresponding follow-up movement of the control piston in the direction of the member to be acted on.

Other features which are considered as characteristic for the invention are set forth in the appended claims.

Although the invention is illustrated and described herein as embodied in a method for engine braking, it is nevertheless not intended to be limited to the details shown, since various modifications and structural changes may be made therein without departing from the spirit of the invention and within the scope and range of equivalents of the claims. That is, the described exemplary embodiments or embodiments should be understood merely as examples and not as being in any way restrictive and the various elements described herein may also be combined in further combinations that are not specifically described by may lead to further advantages.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
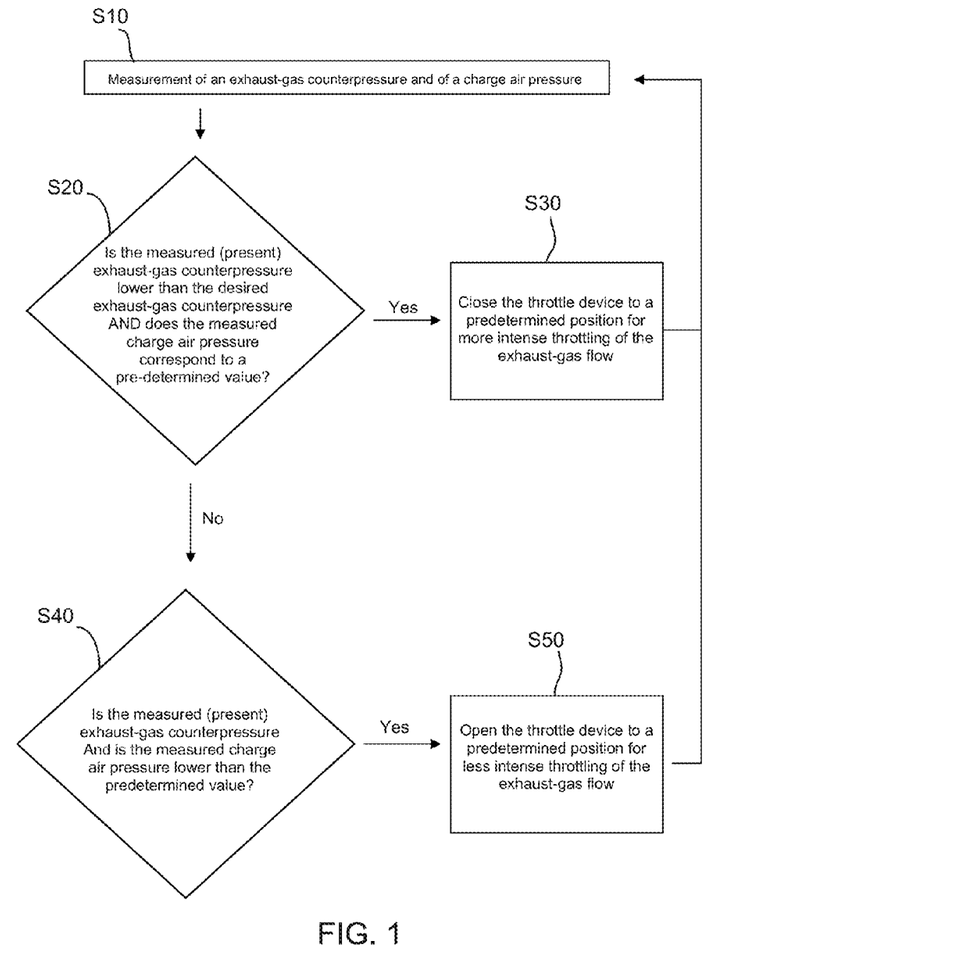
FIG. 1 shows a flow diagram of an exemplary embodiment of the method according to the invention for engine braking.

Referring now to the figures of the drawing in detail and first, particularly, to FIG. 1 thereof, there is shown a flowchart diagram of an exemplary embodiment of the method for engine braking according to the invention. A measurement of an exhaust-gas counter-pressure and of a charge air pressure firstly takes place in step S10. The measurement of the static and/or dynamic pressure of the exhaust gas and of the charge air takes place for example using known pressure sensors P, as shown schematically in FIG. 9. The pressure sensor P for detecting or measuring the charge air pressure is arranged for example between the charge air compressor 105 and the engine M or the cylinders 101.

The pressure sensor P for detecting or measuring the exhaust-gas counter-pressure may be arranged between the engine M or the outlet valves 102 of the engine M and the exhaust-gas turbine 106. In this case, the pressure sensor P may be arranged between the engine M or the outlet valves 102 of the engine M and the throttle device or device 4 for throttling. Alternatively or in addition, the or a pressure sensor P may be arranged between the throttle device 4 and the exhaust-gas turbine 106 upstream of the bypass line to the unit for charge pressure regulation 107. Alternatively or in addition, the or a further pressure sensor P may be arranged downstream, that is to say after the exhaust-gas turbine and upstream of an exhaust-gas aftertreatment arrangement.

In step S20, it is determined whether the measured, that is to say present exhaust-gas counter-pressure is lower than a desired exhaust-gas counter-pressure and the measured, that is to say present charge air pressure corresponds to a predetermined value. In the case of a positive determination, in step S30, a throttle device 4 (see FIG. 9) is closed into or onto a predetermined position for more intense throttling of the exhaust-gas flow. In this case, the flap of the throttle device 4 is moved in such a manner that the cross section through which the exhaust gas flows is reduced.

In the case of a negative determination, it is determined in step S40 whether the measured, that is to say present exhaust-gas counter-pressure is lower than a desired exhaust-gas counter-pressure and the measured, that is to say present charge air pressure is lower than a predetermined value. In the case of a positive determination, in step S50, the throttle device 4 is opened into or to a predetermined position so that in steps S30 and S50, regulation of the exhaust-gas counter-pressure and of the charge air pressure is carried out by adjusting a throttle device 4 corresponding to a determination of the optimum position of the throttle device 4.

The determination of the position of the throttle device 4, that is to say the flap position, is determined for example by virtue of a sensor detecting or measuring the position of the flap of the throttle device 4 and feeding it back for example to a central electronic control, evaluating and regulating unit or control unit 104 of the engine M or of the vehicle in which the engine M is installed (see FIG. 9).

The control process can be improved by way of a position sensor, because then defined (predetermined) positions of the flap can be immediately assumed by pilot control, and control activity is required only for precise adjustment of the desired braking power.

According to a further aspect of the present invention, in addition or alternatively to the example of the method according to the invention specified above, the bypass line B, shown in FIG. 9, which has an integrated unit for charge pressure regulation 107 and which bypasses the exhaust-gas turbine 106 can be used for setting the charge pressure. Here, the unit for charge pressure regulation 107 which is integrated into the bypass line B and which is preferably designed as a wastegate or bypass valve is likewise actuated by the control device 104 such that a partial exhaust-gas flow bypassing the exhaust-gas turbine 106 is correspondingly adjusted in order thereby in turn to correspondingly influence the behaviour of the exhaust-gas turbine 106 and the charge air compressor 105 connected thereto in order to set the desired charge air pressure.

FIG. 2 shows by way of example a diagram of a profile of charge air pressure and exhaust-gas counter-pressure in relation to or as a function of the position of the throttle device 4 shown in FIG. 9 or its flap at a maximum braking rotational speed, that is to say engine rotational speed during braking operation.

The charge air pressure or charge pressure starts at a very low level (approximately 10% of the maximum charge air pressure) when the throttle device is fully open (0% of the throttle device duct area through which exhaust gas flows is closed off by the flap of the throttle device) during braking operation, and then increases, as the throttle device closes, to a maximum which, in this case, is reached when the throttle device is approximately half open. As the throttle device closes further, the charge air pressure falls again on account of the decreasing gas throughput via the drive of the exhaust-gas turbine and of the charge air compressor connected thereto, until said charge air pressure returns to zero when the throttle device is completely closed, that is to say in the second closed position of the throttle device. The exhaust-gas counter-pressure initially rises approximately in parallel with the charge air pressure and reaches its maximum at a slightly further closed position of the throttle device than the charge air pressure, and then falls to a value of approximately 50% when the throttle device is completely closed, which corresponds to the exhaust-gas counter-pressure generated by the engine without the supply of additional compressed air by the compressor, because when the throttle device is completely closed, the turbine wheel of the exhaust-gas turbocharger is not impinged on by an air flow, and the charge air compressor therefore does not generate any charge air pressure.

For a certain desired exhaust-gas counter-pressure at a braking part load, there are usually two associated possible positions of the throttle device. Here, the more expedient position is always the position with the higher charge pressure. A sensor or closed-loop controller with integrated sensor detects the correct position of the throttle device, for example also from a comparison of the present charge pressure with a setpoint charge pressure from a characteristic map, and can thus always regulate in the direction of that position of the throttle device which provides the exhaust-gas counter-pressure with the higher charge air pressure. The closed-loop controller always checks whether the opening of the throttle device leads to an increase in charge pressure. If a maximum is exceeded, the throttle device is closed again.

Figure 3:
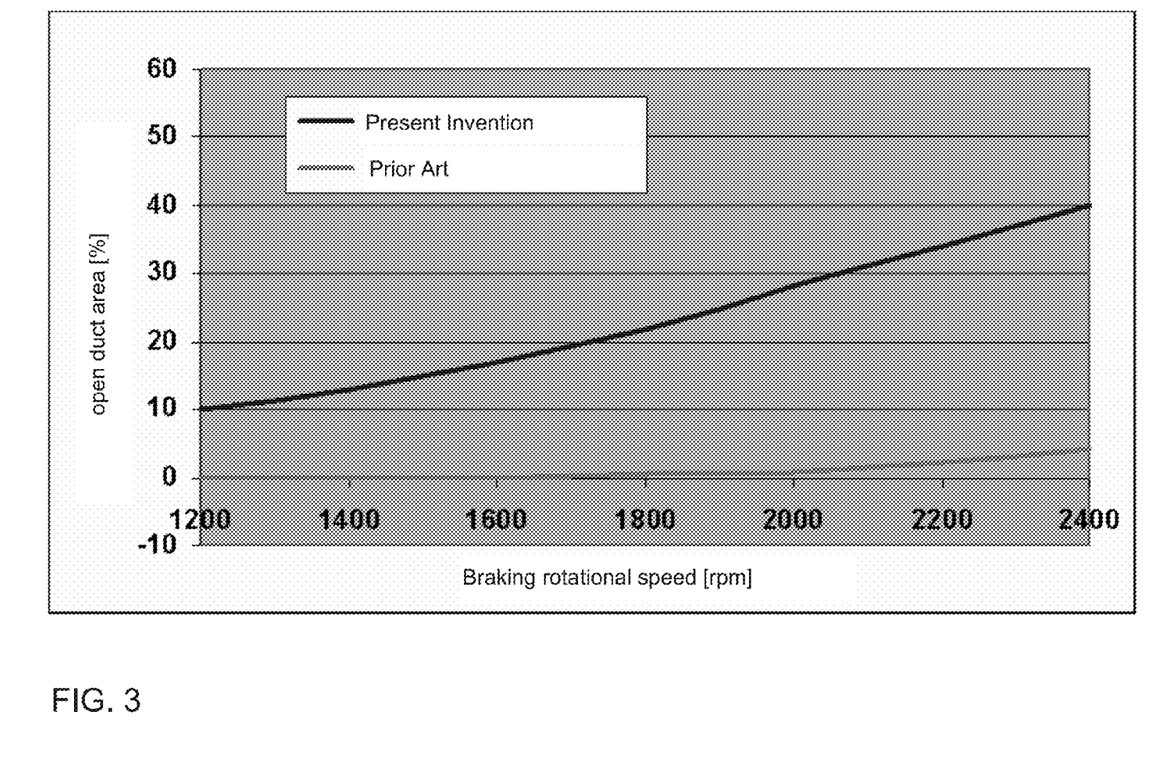
FIG. 3 shows a diagram of a free duct cross section for maximum braking power in a predefined rotational speed range of the device for engine braking according to the invention, in comparison with the prior art.

FIG. 3 shows, by way of example, a diagram of a free duct cross section of the throttle device for maximum braking power in a predefined rotational speed range of the device for engine braking according to the invention, in comparison with the prior art. In a conventional engine braking system without turbocharger assistance, a device for engine braking, such as for example a braking flap, is opened only to a very small degree over the rotational speed range of an engine. The exhaust-gas counter-pressure generated by the device for engine braking therefore results only from the exhaust-gas counter-pressure generated by the engine.

Corresponding to the method according to the invention for engine braking, the device for engine braking can however be opened considerably further. At an engine rotational speed of 1200 revolutions per minute, approximately 10% of the duct cross section of the exhaust system is opened, and at an engine rotational speed of 2400 revolutions per minute, approximately 40% of the duct cross section of the exhaust system is opened. These specifications may of course vary depending on the turbocharger design, that is to say depending on the dimensioning of the exhaust-gas turbine and of the charge-air compressor.

Figure 4A:
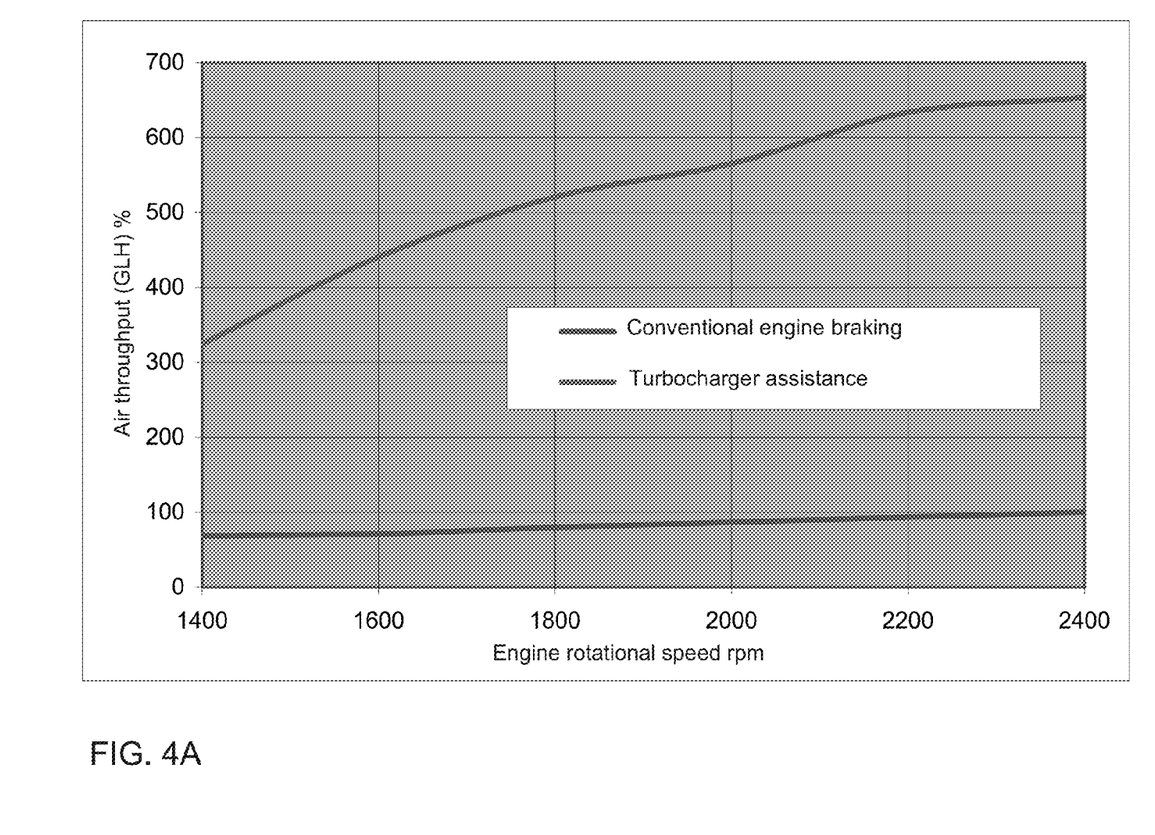
FIG. 4A shows a diagram of a profile of an air throughput in a predefined rotational speed range of the device for engine braking according to the invention, in comparison with the prior art.

FIG. 4A shows, by way of example, a diagram of a profile of an air throughput in a predefined rotational speed range of the device for engine braking according to the invention, in comparison with the prior art. In the case of a conventional engine braking system without turbocharger assistance, the air throughput corresponds merely to the air throughput generated by the engine. This amounts to approximately 70% at an engine rotational speed of 1400 revolutions per minute, and 100% at a maximum engine rotational speed of 2400 revolutions per minute. In the engine braking system according to the invention with turbocharger assistance, the air throughput amounts already to over 300% at 1400 revolutions per minute, and increases to over 600% at 2400 revolutions per minute, that is to say, at 1400 revolutions per minute, the proportion of the air throughput resulting from the turbocharger assistance in relation to the overall air throughput amounts already to three times the value of the air throughput generated by the engine without turbocharger assistance.

Figure 4B:
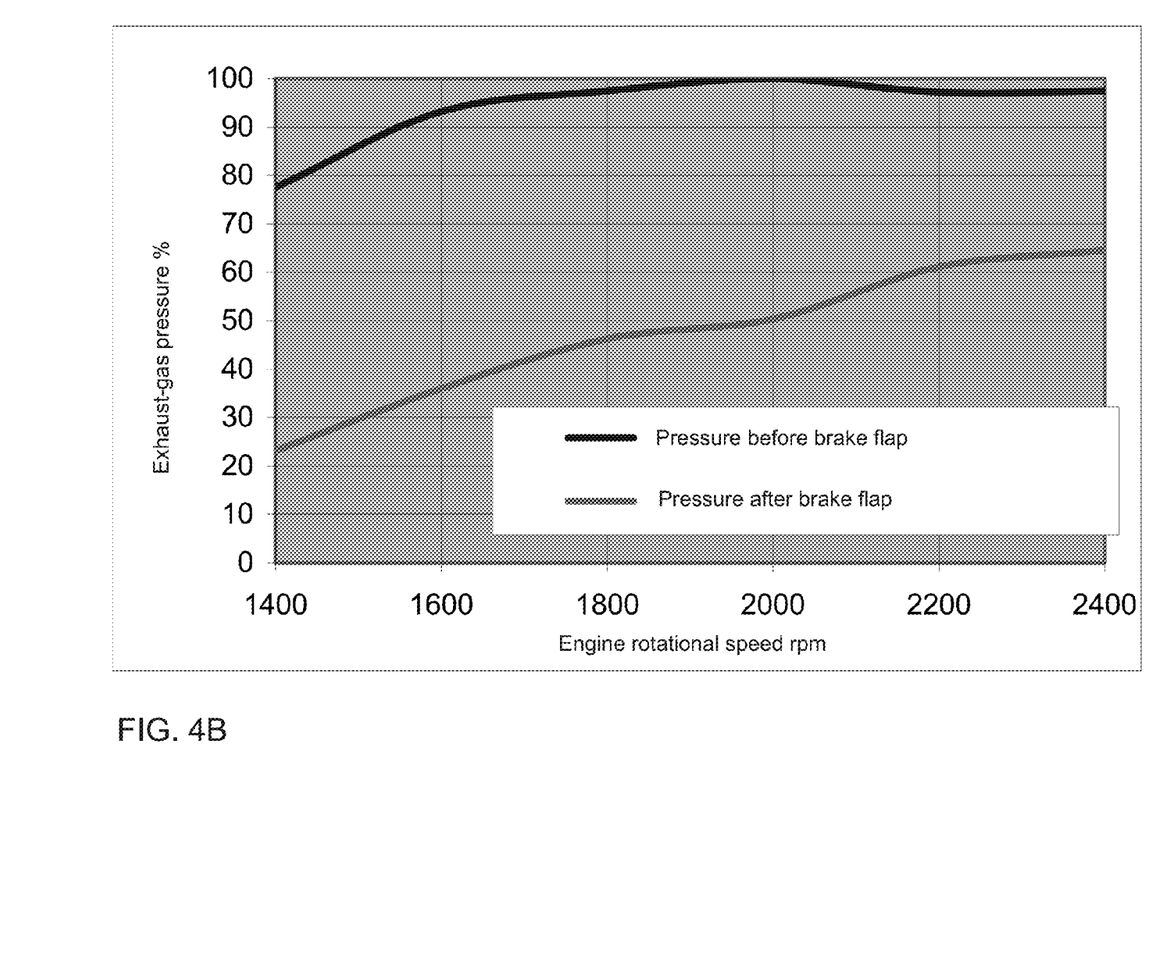
FIG. 4B shows a diagram of a profile of an exhaust-gas counter-pressure upstream of a device for throttling an exhaust-gas flow, and upstream of a turbine of an exhaust-gas turbocharger corresponding to the present invention.

FIG. 4B shows, by way of example, a diagram of a profile of an exhaust-gas counter-pressure upstream of a device for throttling an exhaust-gas flow, and upstream of a turbine of an exhaust-gas turbocharger corresponding to the present invention. The exhaust-gas counter-pressure upstream of the device for engine braking amounts to over 75% at an engine rotational speed of 1400 revolutions per minute, and then rises to 100% at an engine rotational speed of approximately 2000 revolutions per minute. The exhaust-gas counter-pressure subsequently falls slightly up to the maximum engine rotational speed of 2400 revolutions per minute. The exhaust-gas counter-pressure downstream of the device for engine braking and upstream of the turbine of the exhaust-gas turbocharger amounts to approximately 25% at an engine rotational speed of 1400 revolutions per minute, and increases to approximately 65% at a maximum engine rotational speed of 2400 revolutions per minute on account of the increased air throughput resulting from the turbocharger assistance.

Identical or corresponding parts are denoted by the same reference numerals in FIGS. 7A-7D and 7A-7D.

If the associated 4-stroke reciprocating piston internal combustion engine, those figures show only the shank of an outlet valve 10 and the associated valve actuating mechanism, insofar as is necessary for the understanding of the invention.

Said 4-stroke reciprocating piston internal combustion engine basically has, per cylinder, at least one outlet valve connected to an outlet system. The outlet valves can be controlled, for gas exchange processes by a conventional camshaft, via corresponding valve actuating mechanisms. Associated with the outlet valve is a rocker arm 30 which is mounted in the cylinder head 20 and which, depending on the manner in which the camshaft is arranged on the engine, can be actuated by said camshaft either directly or indirectly via a push rod 40. The outlet valve 10 which is guided with its shank in the cylinder head 20 is acted on permanently in the closing direction by a closing spring (not illustrated). Installed in the outlet system is a throttle device, for example a throttle flap, which is actuated via an associated controller for engine braking in such a way that the exhaust-gas flow is throttled, and a pressure increase in the exhaust gas is thus generated upstream of the throttle device. The pressure waves generated during the discharging of adjacent cylinders are superposed on the steady-state back pressure and, as a result of the positive pressure difference, cause an intermediate opening of the outlet valve 10—see phase A1 in the diagram according to FIG. 5. According to the invention, said outlet valve intermediate opening, which takes place independently of the control of the camshaft, is subjected, during braking operation, to a control-based intervention by virtue of the outlet valve 10, which tends toward closing again under the action of its closing spring after the intermediate opening, being forcibly intercepted by a control unit 50 installed remote from the camshaft in the outlet valve actuating mechanism, and then being held in the partially open interception position by means of said control unit over the entire compression stroke and expansion stroke—see phase A2 in the diagram according to FIG. 5.

The control unit 50 may be realized in a variety of ways and installed at different points of the outlet valve actuating mechanism. Examples of this are shown in FIGS. 7A-7D.

In the example according to FIGS. 7A-7D, the control unit 50 is installed and acts in the rocker arm 30 and is composed of two main members, specifically a control piston 60 and a control bush 70. The control piston 60 is movable with low leakage in a bore 80 of the rocker arm 30 axially between two end positions delimited by stops 90, 100, and acts at the front via a curved end surface 110 on the rear end surface 120 of the outlet valve shank, and at the rear side is acted on by a compression spring 130 and can also be subjected to hydraulic pressure.

The control bush 70 is screwed into a threaded section of the same bore 80 in the rocker arm 30 above the control piston 60, and said control bush with its front end surface forms the rear stop 90 which defines the retracted basic position of the control piston 60. The deployed end position of the control piston 60 is delimited by the front stop 100 formed by the rear edge of an encircling groove on the control piston 60, into which groove engages a stroke limiting member 140 fastened to the rocker arm 30.

The control bush 70 has a pressure chamber 150 which is open in the forward direction toward the control piston 60 and in which are installed the compression spring 130 acting on the control piston 60 and a check valve which permits only the introduction of pressure medium from a pressure medium supply duct 160 and has a compression-spring-loaded closing member 170. The pressure medium supply duct 160, which is within the control bush and which is composed of a transverse bore and a bore which proceeds from said transverse bore and opens out centrally into the pressure chamber 150, is supplied with pressure medium, in this case lubricating oil, at a certain pressure from the rocker arm bearing region 190 via a feed duct 18 within the rocker arm. Furthermore, a relief duct 200 leads from the pressure chamber 150 through the control bush 70 and into an insert piece 190 fixedly installed in said control bush, the outlet opening of said relief duct at the insert piece side being held closed during a braking process in the interception and holding phase (A2) of the control unit 50, for the purpose of building up and holding the pressure medium pressure in the pressure chamber 15 and for an associated deployment and holding of the control piston 60 in the deployed outlet valve interception position, by a stop 220 arranged fixed on the cylinder cover 210.

A complete cycle during engine braking will be discussed below on the basis of the figure sequence 7A-7B-7C-7D.

Figure 5:
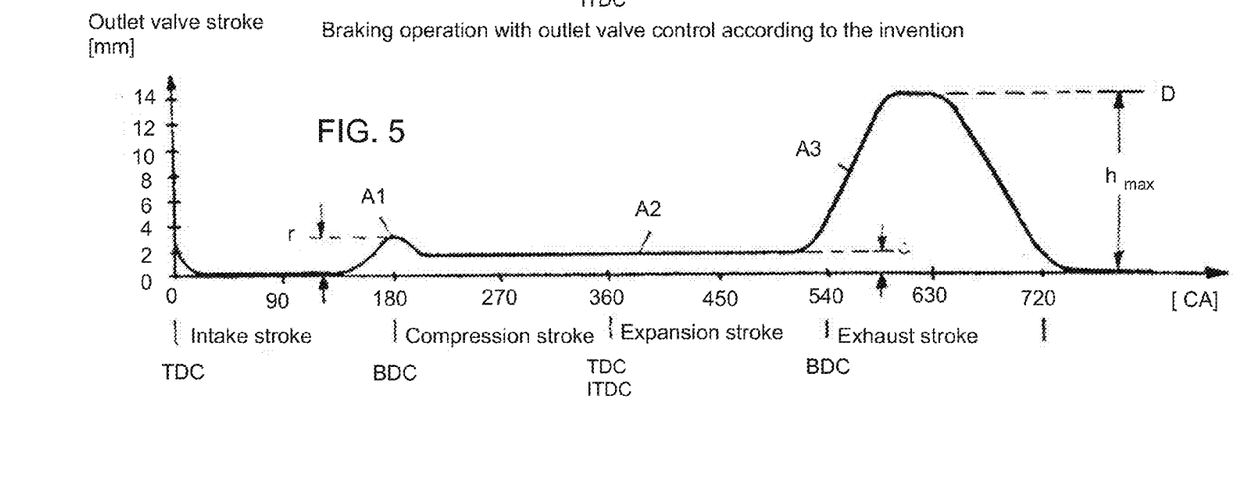
FIG. 5 shows a diagram illustrating the stroke profile of an outlet valve during the braking operation in an application of the braking method according to a further embodiment of the invention.
Figure 6:
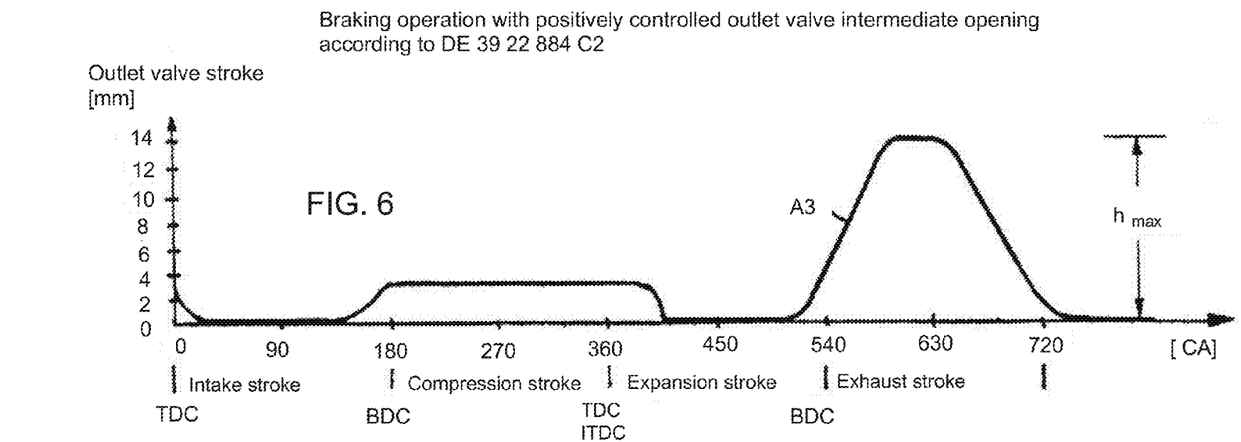
FIG. 6 shows a diagram illustrating the stroke profile of an outlet valve in a braking method as described in the commonly assigned German patent No. DE 39 22 884 C2.
Figure 7A:
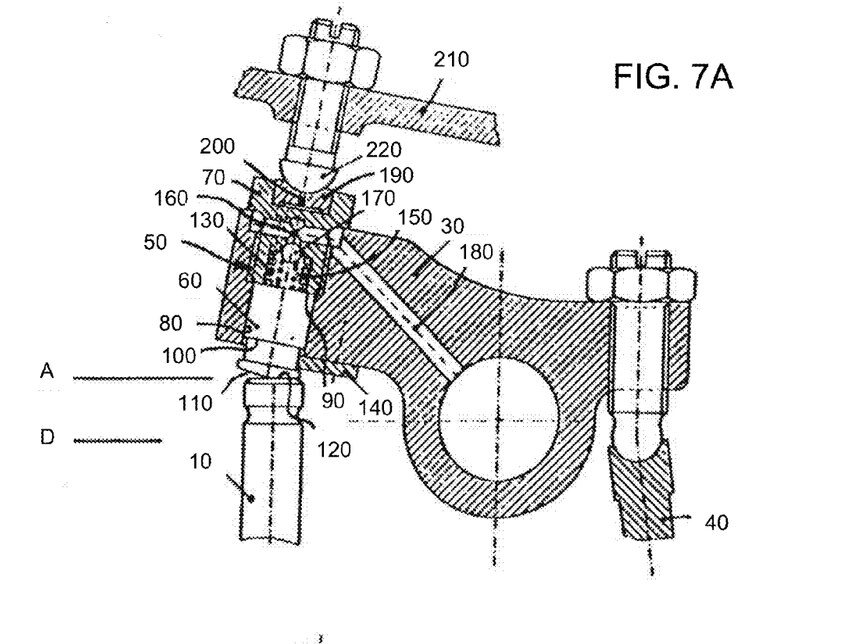
FIGS. 7A-7D each show a detail of an outlet valve actuating mechanism with a further embodiment of a control unit according to the invention in an operating position during braking operation according to the invention.

Here, FIG. 7A shows the outlet valve 10 in the closed position A at the start of the intake stroke (in this regard, see also the diagram in FIG. 5). In said phase, the control unit 50 acts within the rocker arm 30 as a mechanical buffer, the control piston 60 being pushed into the retracted position from below by the outlet valve 10, and the control bush 70 being supported via its insert piece 190 against the stop 220. Any valve play is overcome by means of a partial deployment of the control piston 60.

Figure 7B:
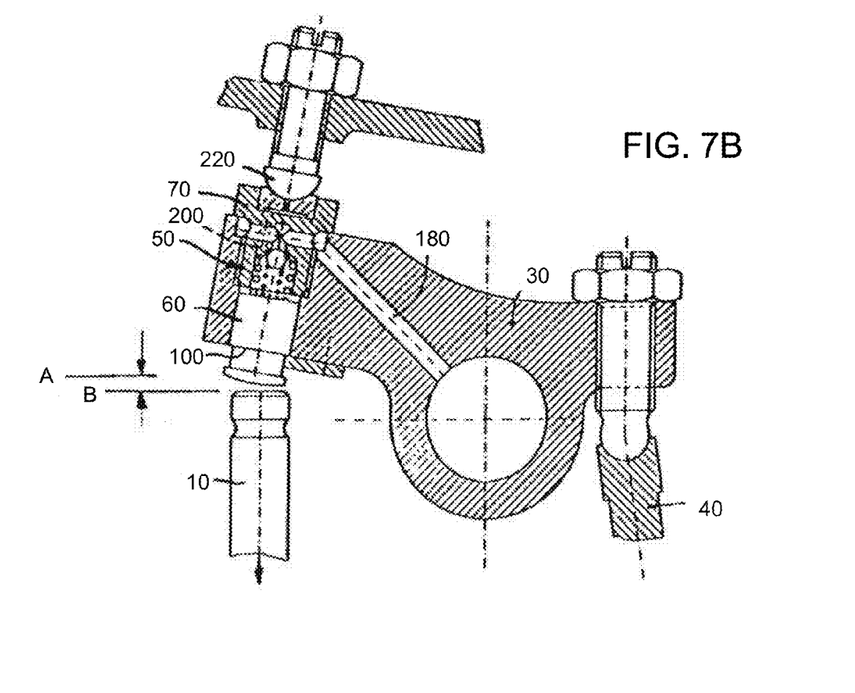

FIG. 7B shows the conditions at the instant when the outlet valve 10 has reached its maximum stroke B in phase A1 (see diagram in FIG. 5) during the exhaust-gas-counter-pressure-induced intermediate opening during engine braking. During said intermediate opening of the outlet valve 10, the latter lifts from the control piston 60 and the latter is deployed, caused to perform a follow-up movement by the compression spring 130, into its interception position. This is associated, because the control piston 60 moves away from the control bush 70, with an enlargement of the pressure chamber 150 and a filling of the latter with pressure medium via the pressure medium supply duct 160, wherein after the pressure chamber has been completely filled, the control piston 160 is hydraulically blocked in its deployed interception position (predefined by stop 100) firstly on account of the blocking check valve 170 and secondly on account of the shut-off outlet opening of the relief duct 200. Said state is shown in FIG. 7B. It can also be seen from FIG. 7B that the outlet valve 10, during the intermediate opening, leads said control piston stroke with a greater stroke A-B.

Figure 7C:
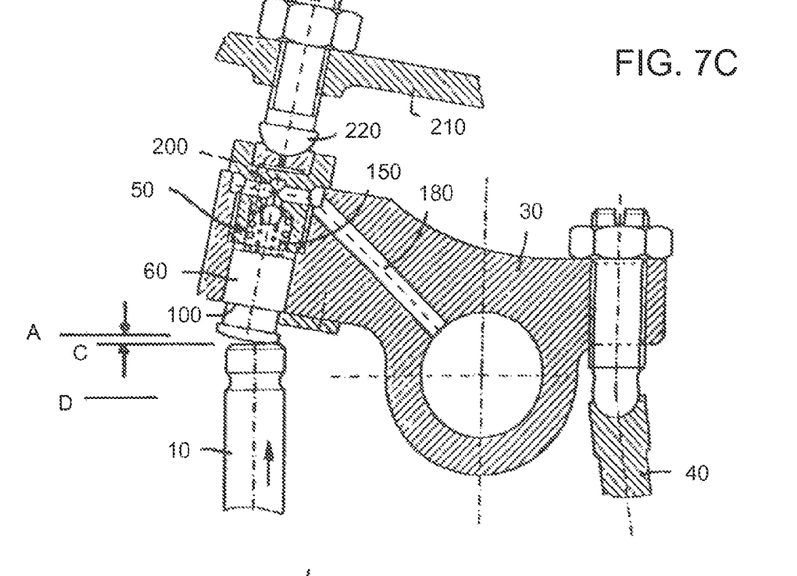

At the transition from phase A1 to phase A2, the outlet valve 10 moves in the closing direction again, but is then intercepted again by the hydraulically blocked control unit 50 already after a short travel B-C. FIG. 7C shows said interception position C under substantially the same conditions as in FIG. 7B, which interception position C is maintained over the entirety of the remaining compression stroke and following expansion stroke.

Only when the camshaft-based control of the outlet valve 10 by means of the associated outlet cam takes effect again at the end of the expansion stroke is said preceding hydraulic blocking of the control unit 50 eliminated, because when the rocker arm 3 is moved in the direction for opening the outlet valve, the control bush 70 lifts with its insert piece 190 from the stop 220. In this way, the relief duct 200 is opened up and pressure medium can flow out of the pressure chamber 150 of the control unit 50, which is now no longer blocked, specifically under the action of the control piston 60 pushed in the direction of its retracted basic position by the outlet valve 10.

Figure 7D:
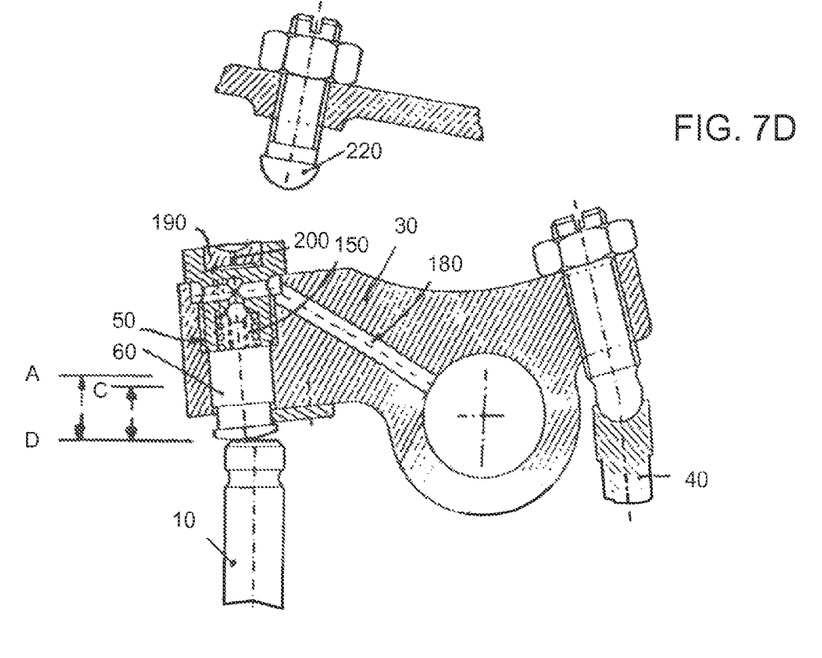

When the control piston 60 is fully retracted, the control device 50 again acts only as a purely mechanical buffer on the rocker arm 30, by means of which then, in phase A3 (see diagram in FIG. 5), during the exhaust stroke during engine braking, the outlet valve 10 is opened up to the full outlet valve stroke D—said position being shown in FIG. 7D—, the holding and re-closing of said outlet valve being controlled by the associated outlet control cam of the camshaft.

At the end of the exhaust stroke during engine braking, the rocker arm 30 with the control unit 50 again assumes the position shown in FIG. 7A, proceeding from which the next braking cycle takes place.

Figure 8:
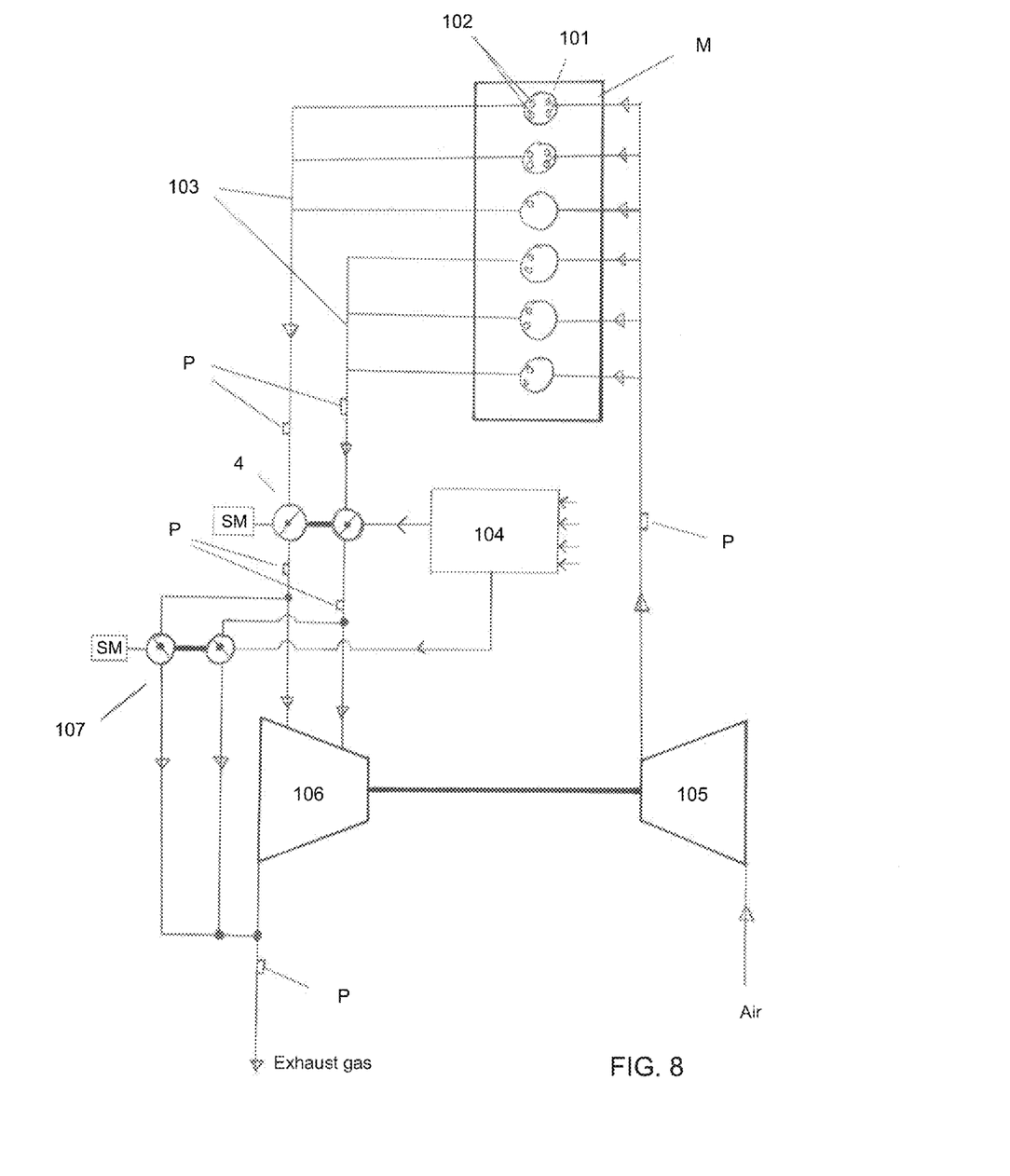
FIG. 8 shows a function diagram of the device according to the invention for throttling the exhaust-gas flow, with a unit for charge pressure regulation.

FIG. 8 shows an overview or a function diagram of an example of the device according to the invention for engine braking of a multi-cylinder internal combustion engine or multi-cylinder engine M comprising a throttle device 4 and a further unit for charge pressure regulation 107.

The engine M illustrated in FIG. 8 acts preferably on the diesel principle and comprises six cylinders 101. Each of the cylinders 101 has at least one outlet valve 102. The engine M also has an exhaust-gas turbocharger comprising a charge air compressor 105 and an exhaust-gas turbine 106. The exhaust-gas turbocharger may be of single-stage or multi-stage design.

The charge air compressor 105 is connected to the air inlet region of the engine M, or the cylinders 101 of the engine M, via a duct system. The charge air compressor 105 is driven by the exhaust-gas turbine 106 via a mechanical connection, preferably via a shaft. Situated between the air inlet region or the cylinders 101 of the engine M and the charge air compressor 105 is at least one pressure sensor P of known design, which determines or measures the static and/or dynamic pressure of the air inducted and subsequently compressed by the charge air compressor 105. An air filter (not illustrated in FIG. 8) for removing corresponding particles of a certain type and size from the air may additionally be provided or arranged upstream of the charge air compressor 105.

At its outlet side, the engine M has at least one exhaust manifold 103 which is connected to the at least one outlet valve 102 of each cylinder 101. The exhaust manifold 103 is also connected to the exhaust-gas turbine 106 of the exhaust-gas turbocharger. Between the engine M or the exhaust manifold 103 and the exhaust-gas turbine 106, the device for engine braking has a throttle device 4 or device 4 for throttling the exhaust-gas flow. Here, the throttle device 4 comprises for example throttle flaps 4 which, as a result of their position in the housing of the throttle device, can influence the through-flow cross section of the exhaust-gas flow and therefore influence the exhaust-gas counter-pressure.

The device 4, designed for example in the form of throttle flaps 4 for throttling the exhaust-gas flow, is controlled in terms of its position preferably by means of an actuating and/or control unit SM, 104, the throttle flaps 4 being mechanically connected to one another. At least one pressure sensor P of known design may be situated between the throttle device 4 and the engine M or the outlet valves 102 of the cylinders 101, which pressure sensor detects or measures the static and/or dynamic pressure of the exhaust gas. In addition or as an alternative thereto, at least one further pressure sensor P may be situated downstream of the throttle device 4.

As already stated in the introduction, the device according to the invention also comprises at least one further unit 107 for charge pressure regulation. The unit 107 for charge pressure regulation comprises at least one bypass line which, in terms of the exhaust-gas flow, bypasses the exhaust-gas turbine 106. The at least one bypass line also has at least one wastegate or one bypass valve. The exhaust gas can be branched off via the at least one bypass line upstream of the exhaust-gas turbine when the bypass valve is open, and the exhaust gas flows past the exhaust-gas turbine 106, for example into an exhaust-gas treatment system and/or silencer system. The at least one wastegate or bypass valve is controlled in terms of its action on the exhaust gas, or its pressure, by means of the actuating and/or control unit SM, 104.

If not the full braking action is required, the provided unit 107 for charge pressure regulation is used in addition or as an alternative to the regulation by means of the throttle device or the device 4 for throttling the exhaust-gas flow, because in this way the charge pressure and therefore the braking action can be set more quickly and sensitively. The charge air compressor 105 generates a predefined charge pressure in the cylinder 101 of the engine M, the exhaust-gas flow being supplied to the device 4 for throttling the exhaust-gas flow via the at least one outlet valve 102 of each cylinder 101 via the exhaust manifold 103.

At a certain engine rotational speed, a defined charge pressure is always set for a given position of the throttle device 4. As already stated, the bypass or supply lines of the unit 107 for charge pressure regulation are arranged in the exhaust-gas duct between the device 4 for throttling the exhaust-gas flow and downstream of the outlet of the exhaust-gas turbine 106. The unit 107 for charge pressure regulation conducts a predefined amount of the exhaust-gas flow past the exhaust-gas turbine 106, wherein the exhaust-gas flow conducted past the exhaust-gas turbine 106 opens out into the exhaust-gas duct again downstream of the exhaust-gas turbine 106.

Both the unit 107 for charge pressure regulation and also the device 4 for throttling the exhaust-gas flow are controlled by a control unit 104. If a charge pressure lower than a maximum charge pressure is to be set, the unit 107 for charge pressure regulation is opened to such an extent that the desired charge pressure is set. To attain the maximum braking action, the wastegate or bypass valve is closed, and regulation is carried out to attain maximum charge pressure.

According to a further embodiment of the invention, the regulation of the exhaust-gas counter-pressure and of the charge air pressure may be carried out, in addition to the regulation by the device 4 for throttling the exhaust-gas flow, by a unit 107 for charge pressure regulation. the unit 107 for charge pressure regulation is preferably formed by a wastegate.

The invention has been explained in more detail on the basis of examples, without being restricted to the specific embodiments.

The invention claimed is:

1. A method for engine braking of a multi-cylinder internal combustion engine of a vehicle, the engine having at least one exhaust-gas turbocharger with an exhaust-gas turbine and a charge air compressor, and an exhaust manifold conducting exhaust-gas flow from outlet valves of the engine to the at least one exhaust-gas turbocharger, and wherein a throttle device is disposed between the outlet valves of the engine and the exhaust-gas turbocharger and is configured to throttle the exhaust-gas flow and to generate a pressure increase in the exhaust gas for engine braking upstream of the throttle device, the method which comprises:
measuring an exhaust-gas counter-pressure and a charge air pressure;
determining, based on the measurement of the exhaust-gas counter-pressure and of the charge air pressure, a position of the throttle device to obtain a predetermined braking action; and
controlling the exhaust-gas counter-pressure and the charge air pressure by adjusting the throttle device corresponding to the previously determined position of the throttle device.

2. The method according to claim 1, which comprises, in order to obtain a maximum braking action at a respective engine rotational speed, first setting a maximum charge air pressure and, after the maximum charge air pressure for the respective engine rotational speed has been reached, closed-loop controlling the maximum exhaust-gas counter-pressure.

3. The method according to claim 1, wherein at least one position of the throttle device corresponds to a given exhaust-gas counter-pressure.

4. The method according to claim 3, which comprises detecting whether or not the throttle device is in a correct position by comparing a current charge air pressure with a setpoint charge air pressure at a current exhaust-gas counter-pressure.

5. The method according to claim 1, wherein a relationship between charge air pressure, exhaust-gas counter pressure and braking action for respective engine rotational speeds is stored in a control unit in the form of characteristic maps.

6. The method according to claim 1, which comprises, if the current exhaust-gas counter-pressure is lower than a desired exhaust-gas counter-pressure and if the charge air pressure corresponds to a predetermined value, closing a position of the throttle device further.

7. The method according to claim 1, which comprises, if the current exhaust-gas counter-pressure is lower than a desired exhaust-gas counter-pressure and if the charge air pressure is lower than a predetermined value, opening a position of the throttle device further.

8. The method according to claim 1, which comprises carrying out closed-loop control of the exhaust-gas counter-pressure and of the charge air pressure, in addition to closed-loop control by the device for throttling the exhaust-gas flow, by a unit for charge pressure control having a wastegate incorporated therein bypassing the exhaust-gas turbine.

9. A device for engine braking of a multi-cylinder internal combustion engine of a vehicle, the engine having an exhaust-gas turbocharger with an exhaust-gas turbine and a charge air compressor, and an exhaust manifold connected to supply an exhaust-gas flow from outlet valves of the engine to the exhaust-gas turbocharger, the device comprising:
a throttle device connected between the outlet valves of the engine and the exhaust-gas turbocharger and configured to throttle the exhaust-gas flow for generating a pressure increase in the exhaust gas and engine braking upstream of the throttle device;
measurement means for measuring an exhaust-gas counter-pressure and a charge air pressure;
a control unit connected to said measurement means and to said throttle device, said control unit being configured for determining, based on the measurement of the exhaust-gas counter-pressure and of the charge air pressure, a position of said throttle device to obtain a predetermined braking action, and said control unit being configured for carrying out closed-loop control of the exhaust-gas counter-pressure and of the charge air pressure by adjusting said throttle device corresponding to the previously determined position of said throttle device.

10. The device according to claim 9, wherein the internal combustion engine is a diesel engine.

11. The device according to claim 9, which comprises, in addition to said device for throttling the exhaust-gas flow, a charge pressure control unit configured to carry out the closed-loop control of the exhaust-gas counter-pressure and of the charge air pressure.

12. The device according to claim 11, wherein said charge pressure control unit comprises at least one wastegate that bypasses the exhaust-gas turbine.

13. A method for engine braking of an engine, the engine having, for each cylinder with a combustion chamber, at least one outlet valve connected to an outlet system, and wherein a throttle device is disposed in the outlet system, the method which comprises:

actuating the throttle device to throttle an exhaust-gas flow and to generate a pressure increase in the exhaust gas upstream of the throttle device, wherein the exhaust gas flows back into the combustion chamber after an intermediate opening of the outlet valve and serves to provide an increased engine braking action during a subsequent compression stroke with the outlet valve still held partially open;

during engine braking, effecting a control-based intervention on an intermediate opening of the outlet valve caused by the pressure increase generated in the exhaust gas when the throttle device is in the throttling position, the intervention including forcibly preventing the outlet valve, which tends toward closing after the intermediate opening, from closing, and then holding the outlet valve partially open at the latest until the outlet valve is opened under cam control, the intervention being effected by a control unit installed remote from the camshaft in the outlet valve actuating mechanism;

wherein the engine further includes at least one exhaust-gas turbocharger with an exhaust-gas turbine and a charge air compressor, and an exhaust manifold connected to supply the exhaust-gas flow from outlet valves of the engine to the at least one exhaust-gas turbocharger, and a throttle device connected between the outlet valves and the at least one exhaust-gas turbocharger and configured to throttle the exhaust-gas flow and to thereby cause a pressure increase in the exhaust gas for engine braking upstream of the throttle device;

measuring an exhaust-gas counter-pressure and a charge air pressure;

determining a position of the throttle device to obtain a predetermined braking action based on the measurement of the exhaust-gas counter-pressure and of the charge air pressure, and effecting a closed-loop control of the exhaust-gas counter-pressure and of the charge air pressure by adjusting the throttle device corresponding to the previously determined position of the throttle device.

14. The method according to claim 13, which comprises, at the end of an expansion stroke, when the control of the outlet valve by the camshaft takes effect again, eliminating the holding function of the control unit which previously acted as a hydraulically blocked buffer, and then controlling the opening of the outlet valve up to its full stroke, the holding of the outlet valve, and the closing of the outlet valve during the exhaust stroke by the associated normal outlet valve control cam by way of the outlet valve actuating mechanism with the control unit then acting therein only as a mechanical buffer.

15. The method according to claim 13, wherein the control unit is installed and acts in a rocker arm mounted on a cylinder head and comprises a control piston that is movable with low leakage in a bore of the rocker arm axially between two end positions delimited mechanically by stops and which acts at the front on the rear end surface of shank of the outlet valve which is acted on at a rear side by a compression spring and hydraulically, and a control bush which is screwed into a threaded section of the same rocker arm bore and in whose pressure chamber, which is open in the forward direction toward the control piston, is installed the compression spring acting on the control piston and a check valve, which check valve permits only the introduction of pressure medium from a pressure medium supply duct and has a compression-spring-loaded closing member, which pressure medium supply duct is supplied with pressure medium via a feed duct within the rocker arm, wherein a relief duct leads from the pressure chamber through the control bush to an upper end of the control bush, and wherein the method further comprises: holding an outlet opening of the relief duct closed during a braking process in the interception and holding phase of the control unit, for the purpose of building up and holding a pressure medium pressure in the pressure chamber and for an associated deployment and holding of the control piston in the deployed outlet valve interception position, by a stop fixedly mounted on the cylinder cover.

16. The method according to claim 15, which comprises, during a braking process, during the exhaust-gas-counter-pressure-induced intermediate opening of the outlet valve, pushing the control piston out into a deployed end position thereof on account of forces acting in the pressure chamber and following the outlet valve shank, and as a result filling the pressure chamber which becomes larger in volume with pressure medium, and therefore subsequently hydraulically blocking the control piston in the outlet valve interception position and in the position, by means of the end surface thereof, intercepting and correspondingly holding open the outlet valve that is moving in the closing direction.

17. The method according to claim 16, wherein a return of the control piston from its outlet valve interception position into its retracted basic position at the end of the holding phase takes place in that, upon the actuation of the rocker arm by the camshaft with the normal outlet cam directly or indirectly via a push rod, as a result of the pivoting of said rocker arm away from the cylinder-cover-side stop, the outlet opening of the relief duct within the control bush at the upper end of the control bush is opened up, and therefore the pressure medium in the pressure chamber is relieved of pressure and released from the volume of the control piston which can now move back and is no longer blocked by the rocker arm, the release taking place until the control piston has assumed its fully retracted basic position.

18. The method according to claim 14, wherein the engine is an internal combustion engine with an underlying camshaft, and wherein the outlet valve is actuated via a push rod, connected to the camshaft, and a following rocker arm, and:

wherein the control unit acts in the chamber between the push rod and a force introduction member of the rocker arm in a holding sleeve arranged in or on the cylinder head, and the control unit has a control sleeve coaxially movable with low leakage in the holding sleeve and supported on the upper end of the push rod and has a control piston installed so as to be coaxially movable with low leakage in a blind bore of the control sleeve, the control piston being supported at the top on a thrust transmission part articulated on the force introduction member of the rocker arm and acted on at the bottom by a compression spring which acts in a direction of the thrust transmission part, the compression spring being installed in that part of the blind bore provided below the control piston and the hydraulic pressure chamber thus delimited, which pressure chamber is supplied with pressure medium via a feed duct within the cylinder head or block and via a feed duct within the holding sleeve and via a supply duct, which communicates with the feed duct within the holding sleeve, within the control sleeve; and wherein a check valve installed in the pressure chamber prevents, by means of its spring-loaded closing member, a return flow of pressure medium from the pressure chamber into the supply duct.

19. The method according to claim 18, wherein, during a braking process, during the exhaust-gas-counter-pressure-induced intermediate opening of the outlet valve, deploying the control piston on account of the forces acting in the pressure chamber, and causing the rocker arm to perform a follow-up movement, wherein during the deployment of the control piston, after a stroke travel coordinated with the spring-open stroke of the outlet valve, the outlet opening of a relief duct within the control piston is opened up by emerging from the blind bore in the control sleeve, and the pressure medium within the pressure chamber is relieved of pressure via the relief duct; and at a start of a subsequent closing movement of the outlet valve, moving the control piston in the direction of its non-deployed basic position by the rocker arm which has performed a corresponding follow-up movement, and closing the thrust transmission part until the outlet opening of the relief duct is closed by the wall of the blind bore, as a result of which the pressure chamber is shut off again, the control unit is therefore hydraulically blocked, and the outlet valve remains held intercepted in the corresponding partially open position.

20. The method according to claim 18, wherein the elimination of the hydraulic blocking of the control piston in the control sleeve and the return of the control piston out of the outlet valve interception position into its non-deployed basic position take place when, during actuation of the push rod by the camshaft with the normal outlet cam, and the associated stroke of the control sleeve, after a certain stroke, coordinated with the maximum opening stroke of the outlet valve, of the control sleeve, as a result of the emergence thereof from the holding bore of the holding sleeve, the outlet cross section of a relief bore extending transversely from the pressure chamber is opened up, the pressure medium situated in the pressure chamber is relieved of pressure and is released from the volume of the control piston which can now move back, the release continuing until the control piston has assumed its fully retracted basic position, attained when the thrust transmission part sets down on the end side of the control sleeve.

21. The method according to claim 13, which comprises, after the exhaust-gas-counter-pressure-induced intermediate opening, holding the outlet valve in an interception position, the distance of which from the closed position amounts to approximately $1/5$ to $1/20$ of a full camshaft-controlled outlet valve opening stroke.

22. The method according to claim 13, which comprises also taking into consideration the control unit as an hydraulic valve play compensating element, and compensating a degree of play occurring in the valve actuating mechanism by correspondingly replenishing pressure medium into the pressure chamber with corresponding follow-up movement of the control piston in the direction of the member to be acted on.

* * * * *